United States Patent
Lemme et al.

(10) Patent No.: US 8,235,108 B2
(45) Date of Patent: Aug. 7, 2012

(54) SWELL PACKER AND METHOD OF MANUFACTURING

(75) Inventors: Frederick Lemme, Katy, TX (US); Nitin Y. Vaidya, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 470 days.

(21) Appl. No.: 12/395,752

(22) Filed: Mar. 2, 2009

(65) Prior Publication Data

US 2009/0229816 A1    Sep. 17, 2009

Related U.S. Application Data

(60) Provisional application No. 61/036,740, filed on Mar. 14, 2008.

(51) Int. Cl.
*E21B 23/02*    (2006.01)
(52) U.S. Cl. ........................................ 166/179
(58) Field of Classification Search .............. 166/179, 166/387
See application file for complete search history.

(56) References Cited

U.S. PATENT DOCUMENTS

| 4,862,967 | A | 9/1989 | Harris |
| 6,834,725 | B2 | 12/2004 | Whanger |
| 7,165,622 | B2 | 1/2007 | Hirth |
| 7,234,533 | B2 | 6/2007 | Gambier |
| 7,304,098 | B2 | 12/2007 | Zhou |
| 7,357,189 | B2 | 4/2008 | Aldaz |
| 7,373,991 | B2 | 5/2008 | Vaidya |
| 2008/0185158 | A1 | 8/2008 | Chalker |
| 2009/0242189 | A1 | 10/2009 | Vaidya |
| 2009/0294118 | A1 | 12/2009 | Clemens |
| 2010/0300689 | A1* | 12/2010 | McRobb et al. .............. 166/285 |

FOREIGN PATENT DOCUMENTS

WO    2007150040    12/2007

* cited by examiner

*Primary Examiner* — William P Neuder
(74) *Attorney, Agent, or Firm* — Rodney V. Warfford; Tim Curington; Robb Edmonds

(57) ABSTRACT

A sealing member. The sealing member can include a support member having an inner bore and a plurality of apertures formed therethrough. An outer swellable element can be disposed about an outer diameter of the support member, and an inner swellable element can be disposed about an inner diameter of the support member. The swellable elements can be unitized with one another through each aperture. A retainer can be disposed at each end of the support member.

16 Claims, 4 Drawing Sheets

FIG. 6
FIG. 7
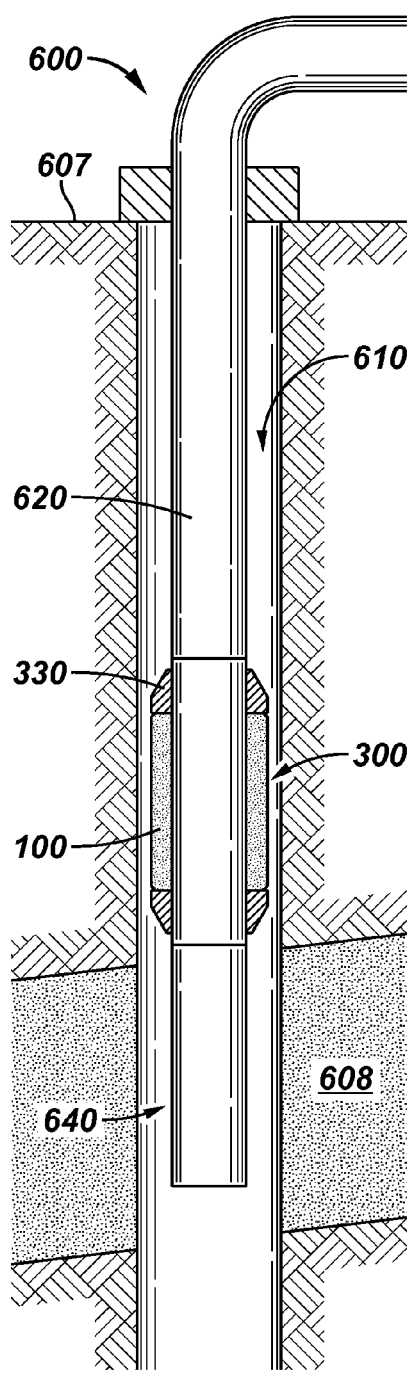
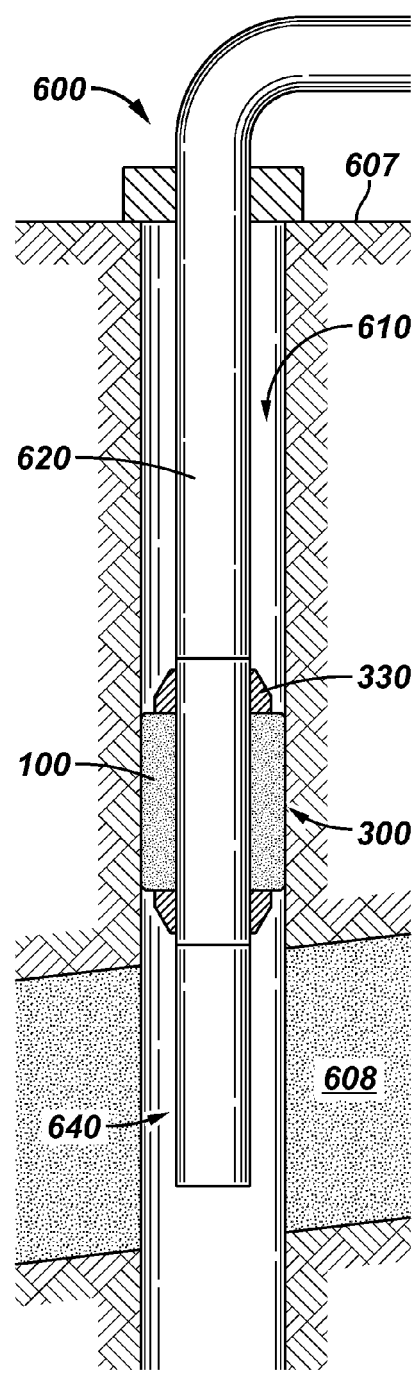

SWELL PACKER AND METHOD OF MANUFACTURING

CROSS-REFERENCE TO RELATED APPLICATIONS

This application claims priority to U.S. Provisional Patent Application having Ser. No. 61/036,740, filed on Mar. 14, 2008, which is incorporated by reference herein.

BACKGROUND

Hydrocarbon fluids such as oil and natural gas are obtained from a subterranean geologic formation, referred to as a reservoir, by drilling a well that penetrates the hydrocarbon-bearing formation. Once a wellbore has been drilled, the well must be completed before hydrocarbons can be produced from the well. A completion involves the design, selection, and installation of equipment and materials in or around the wellbore for conveying, pumping, or controlling the production or injection of fluids. After the well has been completed, production of oil and gas can begin.

Sealing systems, such as packers or anchors, are commonly deployed in a well as completion equipment. Packers are often used to isolate portions of a wellbore from one another. For example, packers are used to seal the annulus between a tubing string and a wall or casing of the wellbore, isolating the portion of the wellbore above the packer from the portion of the wellbore below the packer. Packers are actuated by hydraulic pressure transmitted either through the tubing bore, annulus, or a control line. Other packers are actuated via an electric line deployed from the surface of the wellbore. Furthermore, packers have been used that employ elements that respond to the surrounding well fluids and swell to form a seal. Many different materials have been disclosed as capable of having this feature and some designs have gone further to prevent swelling until the packer is close to the position where it will be set. Often swelling packers have a limited ability to create contact pressure between the tubular and wall of the wellbore. When a wellbore has non-uniformity and eccentricity, as often encountered in openhole wellbores, the swelling packer's ability to form contact pressure between a tubular and the wall of the wellbore is further limited. The amount of contact pressure is a factor in the packer's ability to control the level of differential pressure between portions of the wellbore.

In addition, the sealing element of swellable packers often extrudes longitudinally as the swellable packer expands radially. The longitudinal extrusion of the sealing element within the swellable packers can reduce the packer's ability to handle differential pressures between portions of a wellbore.

A need exists, therefore, for a swellable packer that can be used in an openhole or cased wellbore and that prevents the sealing element from extruding longitudinally as the packer expands radially.

SUMMARY

Sealing members and methods for manufacturing a sealing member are provided. In one or more embodiments, the sealing member can include a support member having an inner bore and a plurality of apertures formed therethrough. An outer swellable element can be disposed about an outer diameter of the support member, and an inner swellable element can be disposed about an inner diameter of the support member. The swellable elements can be unitized with one another through each aperture. A retainer can be disposed at each end of the support member.

One or more embodiments of the method for manufacturing a sealing member can include disposing a support member having one or more holes formed therethrough within a mold cavity. A swellable material can be injected into the mold cavity. A first portion of the swellable material can be disposed on an exterior of the support member. A second portion of the swellable material can flow through the holes and can be disposed about an inner diameter of support member. The swellable material can be cured to form a seal element as described above.

BRIEF DESCRIPTION OF THE DRAWINGS

So that the recited features can be understood in detail, a more particular description, briefly summarized above, may be had by reference to one or more embodiments, some of which are illustrated in the appended drawings. It is to be noted, however, that the appended drawings illustrate only typical embodiments and are therefore not to be considered limiting of its scope, for the invention may admit to other equally effective embodiments.

FIG. 6 depicts a schematic view of a sealing system in an original configuration located within a wellbore, according to one or more embodiments described.

FIG. 7 depicts a schematic view of the sealing system of FIG. 6 in an expanded configuration located within the wellbore, according to one or more embodiments described.

DETAILED DESCRIPTION

Figure 1:
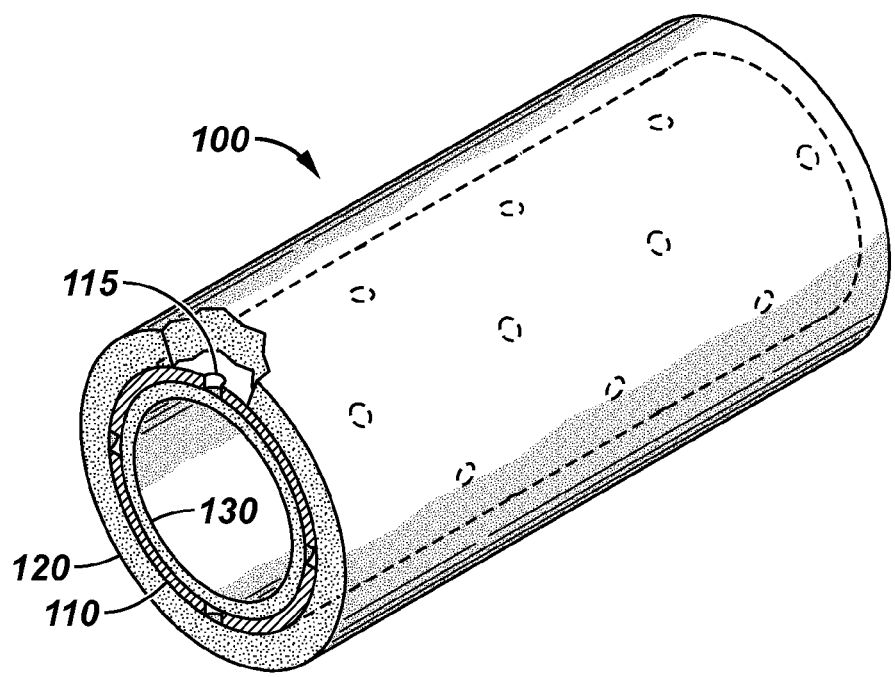
FIG. 1 depicts an isometric view of an illustrative sealing member, according to one or more embodiment described.

FIG. 1 depicts an isometric view of an illustrative sealing member 100, according to one or more embodiments. The sealing member 100 can include a support member 110 having an outer swellable element 120 disposed about an outer diameter thereof. The support member 110 can also have an inner swellable element 130 disposed about an inner diameter thereof. The support member 110 can have holes 115 formed therethrough allowing the outer swellable element 120 to unitize with the inner swellable element 130.

The outer swellable element 120 can be disposed about the support member 110 and can be configured to engage a wall of a wellbore or other structure disposed about the outer swellable element 120. The outer swellable element 120 can be disposed about the support member 110 by transfer molding, compression molding, or injection molding. As the outer swellable element 120 is disposed about the support member 110, the outer swellable element 120 can flow through the holes 115 and form or create the inner swellable element 130.

The inner swellable element 130 can be configured to swell within the support member 110 about a tubular or other object at least partially disposed within the support member 110.

Since the outer swellable element 120 creates the inner swellable element 130, the swellable elements 120, 130 are unitized. The unitization of the inner swellable element 130 and the outer swellable element 120 can allow the sealing member 100 to resist differential pressure.

The swellable elements 120, 130 can be made by any swellable material. Illustrative swellable materials can be or include ethylene-propylene-copolymer rubber hydrocarbon oil, ethylene-propylene-diene terpolymer rubber hydrocarbon oil, butyl rubber hydrocarbon oil, halogenated butyl rubber hydrocarbon oil, brominated butyl rubber hydrocarbon oil, chlorinated butyl rubber hydrocarbon oil, chlorinated polyethylene hydrocarbon oil, starch-polyacrylate acid graft copolymer water, polyvinyl alcohol cyclic acid anhydride graft copolymer water, isobutylene maleic anhydride water, acrylic acid type polymers water, vinylacetate-acrylate copolymer water, polyethylene oxide polymers water, carboxymethyl celluclose type polymers water, starch-polyacrylonitrile graft copolymers water, highly swelling clay minerals (i.e. sodium bentonite) water, styrene butadiene hydrocarbon, ethylene propylene monomer rubber hydrocarbon, natural rubber hydrocarbon, ethylene propylene diene monomer rubber hydrocarbon, ethylene vinyl acetate rubber hydrocarbon, hydrogenised acrylonitrile-butadiene rubber hydrocarbon, acrylonitrile butadiene rubber hydrocarbon, isoprene rubber hydrocarbon, chloroprene rubber hydrocarbon, or polynorbornene hydrocarbon.

In one or more embodiments, the swellable elements 120, 130 can be disposed about the support member 110 by transfer molding. Transfer molding can include heating swellable material in a transfer pot, and disposing the support member 110 within a mold cavity. When the swellable material is heated to a temperature suitable for molding, the moldable swellable material is forced into the mold cavity. For example, the moldable swellable material can be forced into the mold cavity by a ram or piston. The swellable material can be deposited or molded about the support member 110. As the swellable material is deposited on the exterior of the support member 110, the holes 115 allow the swellable material to flow therethrough disposing the swellable material about the inner portion of the support member 110. Accordingly, the inner swellable element 130 and the outer swellable element 120 can be disposed about the support member 110. The support member 110 can separate the inner swellable element 130 and the outer swellable element 120 and can provide support to the swellable elements 120, 130. Furthermore, since the inner swellable element 130 and outer swellable element 120 are disposed about the support member 110 in a single mold cycle the swellable elements 120, 130 are unitized with one another, while being separated from one another by the support member 110. After the swellable material is disposed about the support member 110, the mold cavity is closed and maintained at a temperature sufficient to allow the swellable material to cure. Once the swellable material is cured, the created sealing member 100 is removed from the mold cavity.

Figure 2:
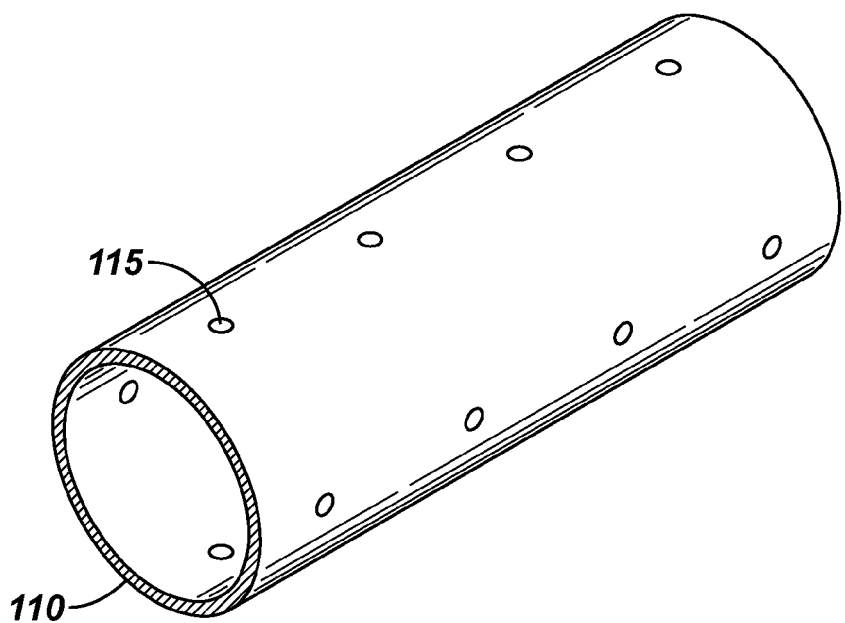
FIG. 2 depicts an isometric view of an illustrative support member, according to one or more embodiments described.

Considering the support member in more detail, FIG. 2 depicts an isometric view of the support member 110. Any number of holes 115 can be formed through the support member 110. For example, the support member 110 can have one, two, three, four, five, ten, twenty, thirty, forty, fifty, sixty, one-hundred, or more holes 115 formed therethrough. The holes 115 can be formed through the support member 110 in any pattern. For example, the holes 115 can be arranged in a circumferential pattern about the support member 110. In one or more embodiments, the circumferential pattern can be from about twenty degrees to about one hundred and eighty degrees. The holes 115 can have an inner diameter ranging from about three eighths of an inch to about three inches. The holes 115 can allow the outer swellable element 120 and the inner swellable element 130 to unite with one another during transfer molding, compression molding, or injection molding.

The support member 110 can be configured to be disposed about a tubular or other circular member. The support member 110 can be aluminum, metal, or another material that is stiff enough to support the swellable elements 120, 130. The support member 110 can provide a stabilizing effect to the sealing member 100 by supporting the inner swellable element 130 and outer swellable element 120. In addition, the support member 110 can separate the inner swellable element 130 and the outer swellable element 120 from one another, while still allowing for unitization of the inner swellable element 130 and the outer swellable element 120. The support member 110 can be a tubular. For example, the support member 110 can be base pipe or other downhole tubular.

Figure 3:
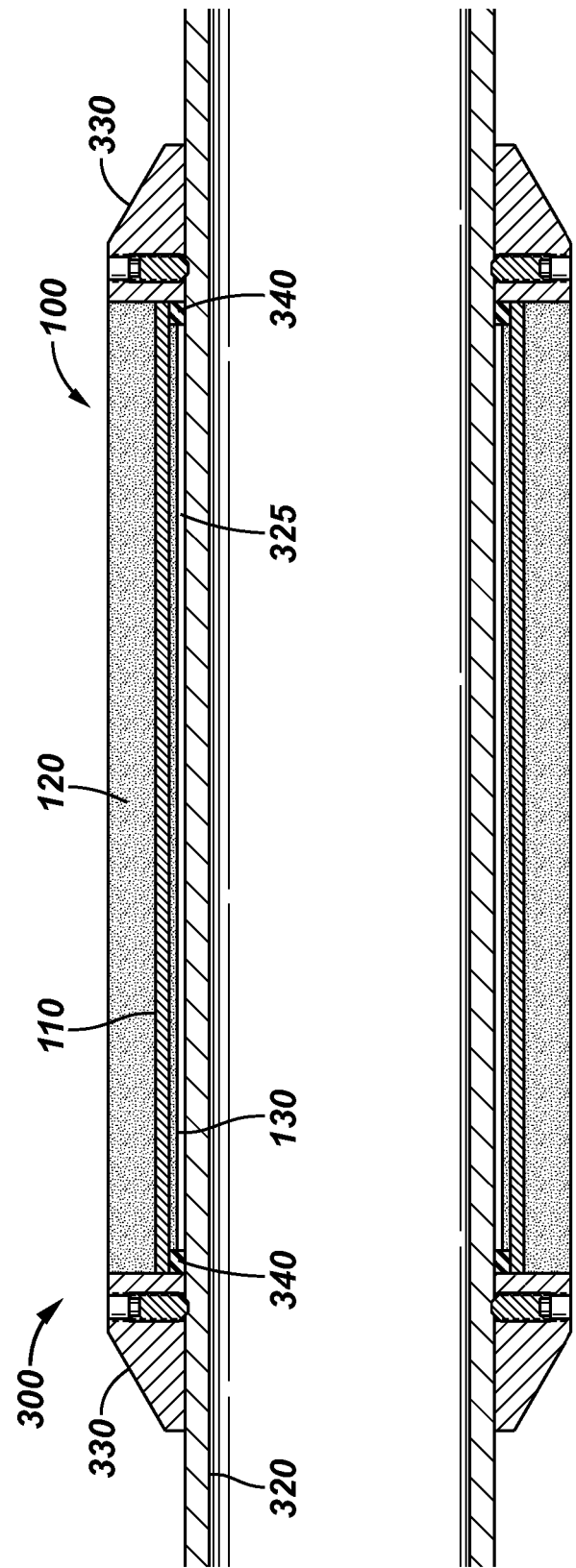
FIG. 3 depicts a cross sectional view of an illustrative sealing member assembly, according to one or more embodiments described.

FIG. 3 depicts a cross sectional view of an illustrative sealing member assembly 300, according to one or more embodiments. The sealing member assembly 300 can include the sealing member 100 disposed about a tubular 320, according to one or more embodiments. The sealing member 100 can be disposed about the tubular 320 by locating the tubular 320 at least partially within the support member 110, forming an annulus 325 therebetween. The annulus 325 formed between the inner wall of the support member 110 and the tubular member 320 can be at least partially filed with the inner swellable element 130 in an unexpanded configuration. When the inner swellable element 130 is in an expanded configuration, the inner swellable element 130 can fill the annulus 325 and provide a seal between the tubular 320 and the support member 110. The tubular 320 can be used to connect to a wash pipe or other downhole instrument or equipment. For example, the tubular 320 can be threaded at one or both ends and can threadably connect to a completion assembly. It is possible that the tubular 320 can be configured to connect to other downhole instruments in other ways, such as with a snap latch.

The sealing member assembly 300 can further include two rings or guide rings 330. The two guide rings 330 can be secured to the tubular 320, and the sealing member 100 can be disposed between the guide rings 330. The guide rings 330 can guide or control the radial expansion of the inner swellable element 130 and the outer swellable element 120 as the swellable elements 120, 130 radially expand. As used herein "radial" can include the direction perpendicular to the center line of a wellbore. The guide rings 330 can include solid rings, end rings, or other members configured to attach to the tubular 320. In one or more embodiments, the guide rings 330 can be or include a suitable bearing material, such as steel, stainless steel, or nickel alloys, depending on the well environment.

One or more retainers or sealing devices 340 can be disposed or located at each end of the support member 110. In one or more embodiments, the retainers 340 can be integrated with the support member 110 during injection molding, compression molding, or transfer molding of the sealing member 100. The retainers 340 can be o-rings or other retainers that can seal about the tubular 320 and the support tube 110. The retainers 340 can prevent the inner swellable element 130 from extruding out of the support member 110. Furthermore, the retainers 340 can maintain the differential pressure within a wellbore. In one or more embodiments, the retainers 340 can be supported by metallic anti-extrusion rings (not shown) connected to the tubing 320. For example, the metallic anti-extrusion rings can be bonded to the tubing 320. In another embodiment, the retainer 340 can be made stiffer by the addition of directional reinforcements. The directional reinforcements can include chopped fibers, mats and long fibers of Kevlar, fiber glass and carbon fibers.

Figure 4:
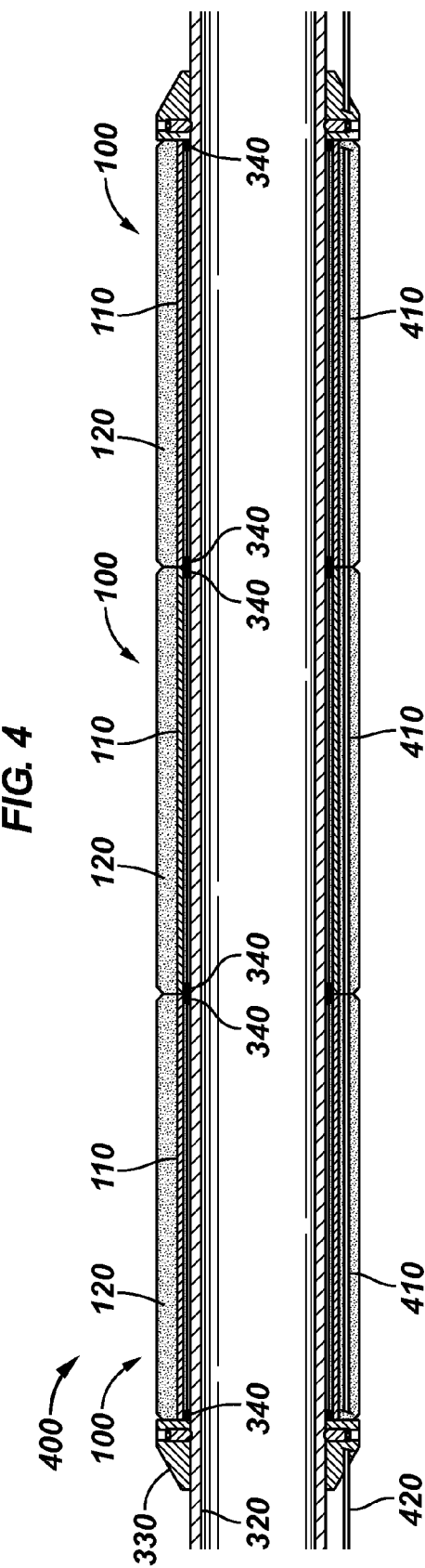
FIG. 4 depicts a cross sectional view of an illustrative stacked sealing member assembly, according to one or more embodiments described.

FIG. 4 depicts a cross sectional view of an illustrative stacked sealing member assembly 400, according to one or more embodiments. The stacked sealing member assembly 400 can include two or more sealing members 100 (three sealing members 100 are shown). The sealing members 100 can be disposed on a tubular or drain pipe similar to as described above. The sealing members 100 can be stacked in series to allow for higher differential zonal pressures. The more sealing members 100 stacked together the larger differential pressure the stacked sealing member assembly 400 can accommodate. For example, if the individual sealing members 100 are rated for a pressure of 1,000 psi and four sealing members 100 are stacked together the four stacked sealing members 100 can handle a pressure of 4,000 psi.

The sealing members 100 can have one or more channels 410 formed therethrough. In one or more embodiments, the channel 410 can be formed through each of the sealing member 100 by molding or other methods. The channels 410 can allow for a control line to be disposed continuously through each of the sealing members 100. For example, one or more control lines 420 (one control line 420 is shown) can be run from the surface through each of the sealing members 100 to an attached completion (not shown). The control line 420 can be an electric control line, a hydraulic control line, a fiber optic control line, or another suitable control line. It is possible for a combination of control lines 420 to be run through the channel 410. For example, a hydraulic control line and electric control line can be run from the surface through each of the sealing members 100 to a completion (not shown) via channel 410.

Figure 5:
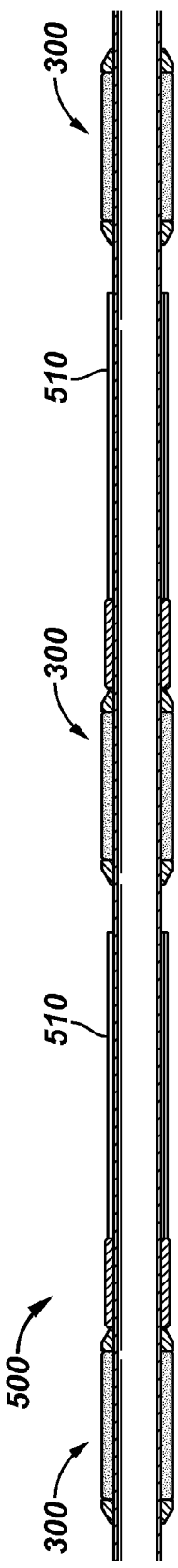
FIG. 5 depicts a cross sectional view of an illustrative completion system, according to one or more embodiments described.

FIG. 5 depicts a cross sectional view of an illustrative completion system 500, according to one or more embodiments. The completion system 500 can include two or more sealing member assemblies 300 (three sealing member assembly 300 are shown). For example, the completion system 500 can include an "upper" or first sealing member assembly 300, an "intermediate" or second sealing member assembly 300, and a "lower" or third sealing member assembly 300. Each of the sealing member assemblies 300 can include a channel (not shown) formed therethrough, which can allow for a control line to be run through the sealing member assemblies 300 in a continuous fashion.

As used herein, the terms "up" and "down;" "upper" and "lower;" "upwardly" and "downwardly;" "upstream" and "downstream;" and other like terms are merely used for convenience to depict spatial orientations or spatial relationships relative to one another in a vertical wellbore. However, when applied to equipment and methods for use in wellbores that are deviated or horizontal, it is understood to those of ordinary skill in the art that such terms are intended to refer to a left to right, right to left, or other spatial relationship as appropriate.

Still referring to FIG. 5, a completion assembly 510 can be disposed between the first and second sealing member assemblies 300 and between the second and third sealing member assemblies 300. Although not shown, a completion assembly 510 can be disposed adjacent the "upper" or first end of the first sealing member assembly 300, and a completion assembly 510 can be disposed adjacent the "second" or lower end of the third sealing member assembly 300. The completion assemblies 510 can include sand completions, inflow control devices, screens and inflow control device, or other completion equipment. Each completion assembly 510 can be selectively chosen to accommodate differing completion needs. The sealing member assemblies 300 can be used to isolate the completion assemblies 510 from one another as well as other portions of the wellbore.

FIG. 6 depicts a schematic view of a completion system 600 in an original configuration within a wellbore 610, and FIG. 7 depicts a schematic view of the completion system 600 in an expanded configuration within the wellbore 610, according to one or more embodiments. Although not depicted, the completion system 600 can be similar to the completion system 500 and/or can incorporate one or more sealing member assemblies 400. The completion system 600 as depicted can include one or more sealing member assemblies 300 connected to a production tubing or other downhole tubing 620. The production tubing 620 can provide fluid communication between the surface 607 and a hydrocarbon bearing zone 608. The production tubing 620 can be part of a conveying device for conveying the sealing member assembly 300 into the wellbore 610. The completion system 600 can further include a completion assembly 640 connected to the sealing member assembly 300. Accordingly, the sealing member assembly 300 can be disposed between the production tubing 620 and the completion assembly 640. The completion assembly 640 can be a sand completion assembly or other completion assembly for performing a downhole operation.

When the completion assembly 640 and the sealing assembly 300 are connected to the production tubing 620, the production tubing 620, the completion assembly 640, and the sealing assembly 300 can be conveyed into the wellbore 610. The completion assembly 640 can be located adjacent a hydrocarbon bearing zone 608. The sealing assembly 300 can be used to isolate the "upper" or first portion of the hydrocarbon bearing zone 608 from the "upper" or first portion of the wellbore 610. In one or more embodiments, a second sealing assembly 300 (not shown) can be connected to a "lower" or second end of the completion assembly 640 and can be used to isolate the "lower" or second portion of the hydrocarbon bearing zone 608 from the "lower" or second portion of the wellbore 610.

The swellable elements 120, 130 can be in an original or unexpanded state as the completion assembly 640 and sealing assembly 300 are conveyed into the wellbore 610, as depicted in FIG. 6. When the completion assembly 640 is located adjacent the hydrocarbon bearing zone 608, the sealing elements 120, 130 can be exposed to a trigger fluid. The trigger fluid can be wellbore fluid such as hydrocarbons, water, or other fluid naturally found in the wellbore 610 or the trigger fluid can be a fluid or chemical dropped into the wellbore 610 or injected into the wellbore 610. The trigger fluid used will depend on the material used to create the swellable elements 120, 130.

When the sealing member 100 is exposed to the trigger fluid, the swellable elements 120, 130 can expand. For example, the outer swellable element 120 can seal against the wall 450 of the wellbore 610 and isolate the first portion of the hydrocarbon producing zone 608 from the first portion of the wellbore 610, and the inner swellable element 130 can expand providing a seal between the tubular 320 and the support member 110. As the swellable elements 120, 130 expand the guide rings 330 can guide or control the movement of the swellable elements 120, 130. The sealing devices 340 can prevent the inner swellable element 130 from extruding out of the support member 110. When the sealing assembly 300 is in an expanded state, as depicted in FIG. 7, production operations or other downhole operations can be executed.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

The invention claimed is:

1. A sealing member comprising:
    a support member having an inner bore and a plurality of apertures formed therethrough;
    an outer swellable element disposed about an outer diameter of the support member;
    an inner swellable element disposed about an inner diameter of the support member, wherein the swellable elements are unitized through each aperture; and
    a retainer disposed at each end of the support member.

2. The sealing member of claim 1, wherein the retainer comprises a metallic anti-extrusion ring.

3. The sealing member of claim 1, wherein the sealing member further comprises a channel formed therethrough.

4. The sealing member of claim 1, wherein a plurality of sealing members can be stacked together in series.

5. The sealing member of claim 1, wherein the plurality of apertures of the support members vary in size.

6. The sealing member of claim 1, wherein the plurality of apertures have a size ranging from about three eighths of an inch to about two inches.

7. The sealing member of claim 1, wherein the plurality of apertures are formed about the support member in a circumferential pattern from about 30° to about 180°.

8. The sealing member of claim 1, wherein the support member is tubular.

9. The sealing member of claim 1, wherein the swellable elements are configured to swell when exposed to wellbore fluid or an injected fluid.

10. A sealing system for use in a subterranean wellbore, comprising:
    a tubular disposed on a conveyance device; and
    a sealing member assembly comprising at least two rings disposed about the tubular, wherein the rings are longitudinally spaced apart from one another, and wherein a sealing member is disposed between the rings, the sealing member comprising:
        a support member disposed about the tubular, the support member comprising a plurality of holes formed therethrough;
        an inner swellable element disposed at least partially between the support member and the tubular;
        an outer swellable element disposed about the exterior of the support member, wherein the swellable elements are unitized with one another; and
        a retainer disposed at each end of the support member, wherein the retainers provide a seal between ends of the support member and the tubular, and wherein the retainers prevent the inner swellable element from extruding out of the ends of the support member.

11. The system of claim 10, wherein the retainers comprises a metallic anti-extrusion ring.

12. The system of claim 10, further comprising a plurality of sealing member assemblies and at least one completion assembly disposed between two of the sealing member assemblies.

13. The system of claim 10, wherein sealing member assembly further comprises a plurality of sealing members disposed in series between the rings.

14. The system of claim 10, wherein the holes have a size ranging from about three eighths of an inch to about two inches.

15. The system of claim 10, wherein the holes are formed about the support member in a circumferential pattern from about 30° to about 180°.

16. The system of claim 10, wherein the support member is a tubular.

* * * * *